(12) United States Patent
Kawasaki

(10) Patent No.: US 10,654,116 B2
(45) Date of Patent: May 19, 2020

(54) CUTTING INSERT, METAL SPACER AND HOLDER

(71) Applicant: TUNGALOY CORPORATION, Fukushima (JP)

(72) Inventor: Sozo Kawasaki, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 43 days.

(21) Appl. No.: 16/146,020

(22) Filed: Sep. 28, 2018

(65) Prior Publication Data

US 2019/0118273 A1  Apr. 25, 2019

(30) Foreign Application Priority Data

Oct. 25, 2017  (JP) ................. 2017-206531

(51) Int. Cl.
*B23B 27/10* (2006.01)
*B23B 27/16* (2006.01)
*B23B 29/12* (2006.01)
*B23C 5/06* (2006.01)
*B23C 5/22* (2006.01)

(52) U.S. Cl.
CPC .............. *B23C 5/06* (2013.01); *B23B 27/10* (2013.01); *B23C 5/22* (2013.01); *B23B 2205/16* (2013.01); *B23B 2226/125* (2013.01); *B23B 2226/315* (2013.01); *B23B 2240/08* (2013.01)

(58) Field of Classification Search
CPC .......... B23B 2205/16; B23B 2226/125; B23B 2226/315; B23B 2240/08; B23B 27/10; B23B 2205/12; B23C 5/06; B23C 5/22; Y10T 407/14; Y10T 408/44; Y10T 408/455; Y10T 407/23
See application file for complete search history.

(56) References Cited

U.S. PATENT DOCUMENTS

| | | | | |
|---|---|---|---|---|
| 4,203,690 A | * | 5/1980 | Tanaka ................. | B23B 27/148 407/119 |
| 4,535,216 A | * | 8/1985 | Cassidenti ............. | B23B 1/00 219/68 |
| 5,183,362 A | * | 2/1993 | Kuroyama ........... | B23B 27/141 407/116 |

(Continued)

FOREIGN PATENT DOCUMENTS

| | | | | |
|---|---|---|---|---|
| EP | 0100376 A2 | * | 2/1984 | ............. B23B 51/00 |
| EP | 0599393 A1 | * | 6/1994 | ........... B23C 5/2221 |

(Continued)

OTHER PUBLICATIONS

Extended European Search Report issued by the European Patent Office dated Mar. 20, 2019, which corresponds to EP18202375.4-1019 and is related to U.S. Appl. No. 16/146,020.

*Primary Examiner* — Sara Addisu
(74) *Attorney, Agent, or Firm* — Studebaker & Brackett PC

(57) ABSTRACT

A cutting insert comprising a cutting tip and a base insert on which the cutting tip is mounted, the cutting insert being provided with a passage PA which is formed along a boundary surface between the cutting tip and the base insert so as to extend from a boundary part, in an upper surface of the cutting insert, between the cutting tip and the base insert to another boundary part, in a lower surface of the cutting insert, between the cutting tip and the base insert.

14 Claims, 9 Drawing Sheets

(56) References Cited

U.S. PATENT DOCUMENTS

| | | | | |
|---|---|---|---|---|
| 5,718,156 | A * | 2/1998 | Lagrolet | B23B 27/10 407/11 |
| 5,846,032 | A * | 12/1998 | Murakami | B23B 27/1622 407/102 |
| 5,924,824 | A | 7/1999 | Satran et al. | |
| 6,053,669 | A | 4/2000 | Lagerberg | |
| 6,951,313 | B2 * | 10/2005 | Frick | B27L 11/005 144/218 |
| 7,322,776 | B2 * | 1/2008 | Webb | B23B 27/145 407/113 |
| 7,510,352 | B2 * | 3/2009 | Craig | B23B 27/1629 407/104 |
| 8,439,609 | B2 * | 5/2013 | Woodruff | B23C 5/109 407/11 |
| 8,827,599 | B2 * | 9/2014 | Henry | B23B 27/10 407/11 |
| 9,242,299 | B2 * | 1/2016 | Taylor | B23B 27/145 |
| 9,302,326 | B2 * | 4/2016 | Hofermann | B23B 27/1614 |
| 9,511,421 | B2 * | 12/2016 | Chen | B23B 27/1677 |
| 9,656,323 | B2 * | 5/2017 | Harif | B23B 27/04 |
| 10,007,246 | B2 * | 6/2018 | Grant | G05B 19/182 |
| 2004/0240949 | A1 * | 12/2004 | Pachao-Morbitzer | B23B 27/065 407/11 |
| 2005/0152804 | A1 * | 7/2005 | Sjogren | B22F 5/003 419/1 |
| 2007/0207715 | A1 * | 9/2007 | Webb | B23B 27/145 451/540 |
| 2008/0175676 | A1 * | 7/2008 | Prichard | B23C 5/2221 407/11 |
| 2008/0175678 | A1 * | 7/2008 | Prichard | B23B 27/10 407/11 |
| 2008/0279644 | A1 * | 11/2008 | Endres | B23B 27/10 408/56 |
| 2010/0172704 | A1 * | 7/2010 | Nelson | B23B 27/10 407/114 |
| 2010/0254772 | A1 * | 10/2010 | Rozzi | B23B 27/10 407/11 |
| 2011/0020072 | A1 * | 1/2011 | Chen | B23B 27/10 407/11 |
| 2011/0027021 | A1 * | 2/2011 | Nelson | B23C 5/109 407/11 |
| 2011/0229277 | A1 * | 9/2011 | Hoffer | B23B 27/10 407/11 |
| 2012/0087747 | A1 * | 4/2012 | Fang | B23B 27/10 407/11 |
| 2013/0078043 | A1 * | 3/2013 | Henry | B23B 27/10 407/11 |
| 2013/0343826 | A1 * | 12/2013 | Webb | B23B 27/148 407/118 |
| 2015/0016902 | A1 * | 1/2015 | Okamura | B23B 27/145 407/116 |
| 2015/0063926 | A1 * | 3/2015 | Wu | B23B 27/10 407/11 |
| 2016/0158855 | A1 * | 6/2016 | Kondameedi | B23P 15/34 407/11 |
| 2019/0047054 | A1 * | 2/2019 | Harif | B23B 27/145 |

FOREIGN PATENT DOCUMENTS

| | | | | |
|---|---|---|---|---|
| JP | 56069007 | A * | 6/1981 | B23Q 11/10 |
| JP | 58109204 | A * | 6/1983 | B23B 27/10 |
| JP | 60127904 | A * | 7/1985 | B23B 27/10 |
| JP | H06-254704 | A | 9/1994 | |
| JP | 3046364 | U | 12/1997 | |
| JP | 2001-287103 | A | 10/2001 | |
| JP | 2003266207 | A * | 9/2003 | |
| JP | 2013-049106 | A | 3/2013 | |
| JP | 2015131387 | A * | 7/2015 | |
| JP | 2015-213992 | A | 12/2015 | |
| JP | 2017-189825 | A | 10/2017 | |
| JP | 2018027605 | A * | 2/2018 | B23B 27/10 |
| JP | 2018111205 | A * | 7/2018 | |
| WO | WO-2018038010 | A1 * | 3/2018 | B23B 27/1614 |
| WO | WO-2019017064 | A1 * | 1/2019 | B23P 15/28 |

* cited by examiner

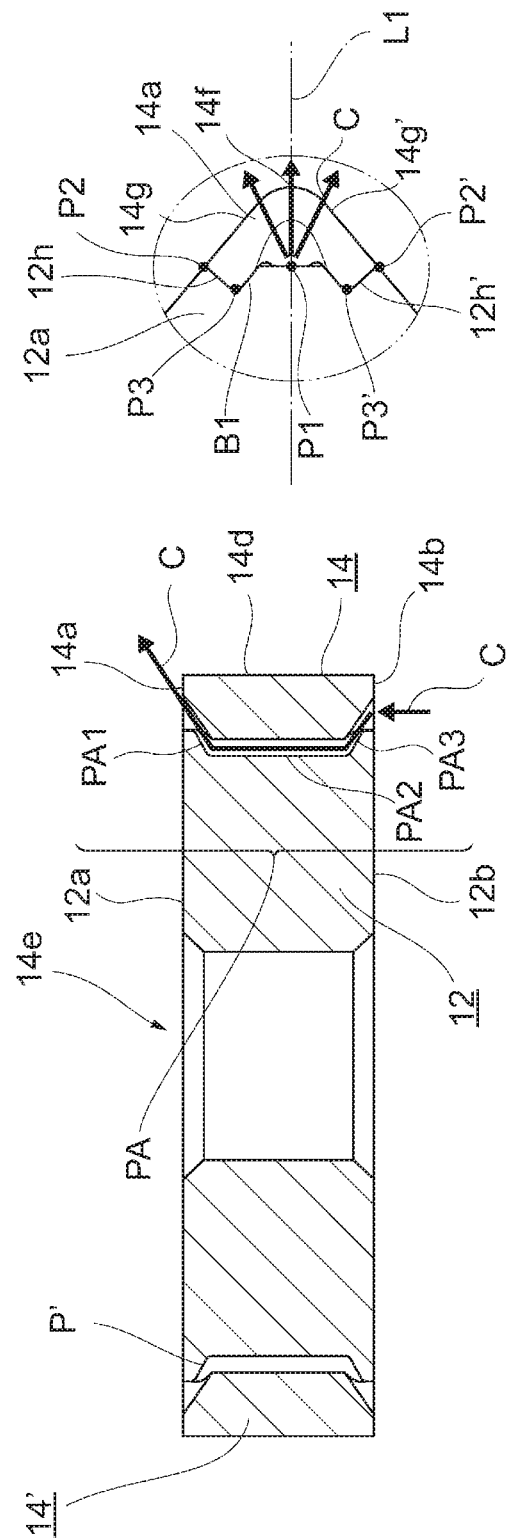

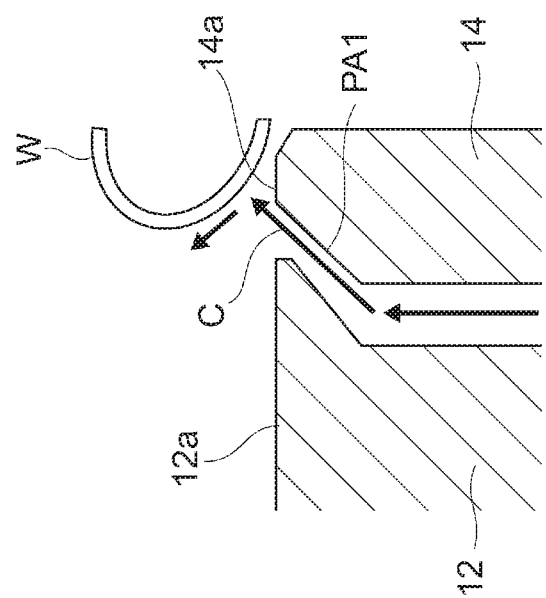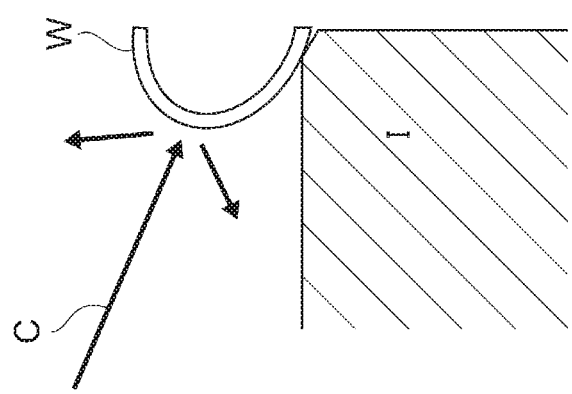

CUTTING INSERT, METAL SPACER AND HOLDER

TECHNICAL FIELD

The present invention relates to a cutting insert, a metal spacer and a holder.

BACKGROUND ART

Patent Document 1 discloses an ultrahigh-pressure sintered body tool wherein: an ultrahigh-pressure sintered body 4, consisting of a cBN sintered body or a diamond sintered body, is provided at a corner part of a cemented carbide material; the ultrahigh-pressure sintered body 4 is provided with a cutting edge 5; an oil supply hole 6 is provided which has an ejection port 6b opened in a flank 8 located immediately below the edge corner part of the tool; and an inclination angle of the ejection port 6b with respect to the flank 8 is set at from 20° or more to 70° or less, whereby the extension of the life of the tool and an improvement in machined-surface quality are achieved.

Patent Document 2 discloses a cutting machining apparatus comprising: work rotating means 16 for rotating a cylindrical work 21 around a cylindrical axis; and cutting means 22 for cutting the rotating work 21 through contact therewith, wherein cutting means 49 comprises spraying means 47 for ejecting a spray medium M to a machined part 25 of the work 21, whereby the machined part of the work is cooled efficiently so that the life of the cutting means is extended and whereby the removal of chips, etc. can be performed efficiently.

Patent Document 3 discloses a throwaway turning tool wherein: a sheet member 22 provided on an insert seat 20 formed at a leading end part of a tool body 14 is structured so as to have, in an upper surface part thereof, a groove part 26 and to be provided with notch parts 28, 30 in the groove part 26; and the tool body 14 is provided with a passage which communicates with a coolant supply part and the notch part 28, as a result of which a throwaway tip is cooled effectively, thereby leading to improvements in edge life and machining accuracy.

CITATION LIST

Patent Documents

Patent Document 1: JP2013-049106 A
Patent Document 2: JP2001-287103 A
Patent Document 3: JPH06-254704 A

SUMMARY

Technical Problem

However, no means for sufficiently cooling a cutting tip serving as a sintered body portion which constitutes a cutting edge has been provided so far. When a cutting tip is at a high temperature, this will cause, for example, the problems of deterioration in machining accuracy and of the wear of the cutting tip being likely to progress.

In view of the above, an object of the present invention is to provide a cutting insert, a metal spacer and a holder with which a cutting tip is cooled effectively so as to achieve an extended tool life.

Solution to Problem

A cutting insert according to an aspect of the present invention comprises: a base insert comprising a first upper surface, a first lower surface and a first side surface connecting the first upper surface and the first lower surface; and a cutting tip comprising a second upper surface, a second lower surface and a second side surface connecting the second upper surface and the second lower surface. The first side surface comprises: a first mounting surface opposing the second side surface; and a first peripheral side surface connected to the first upper surface, the first lower surface and the first mounting surface, and the second side surface comprises: a second mounting surface opposing the first mounting surface; and a second peripheral side surface which is connected to the second upper surface, the second lower surface and the second mounting surface and in which at least an edge connected to the second upper surface is provided with a first cutting edge. Further, the first mounting surface comprises: a first securing surface secured to the second mounting surface; and a first passage surface separate from and opposing the second mounting surface, and the first passage surface, and, in the second mounting surface, a second passage surface opposing the first passage surface, form a passage which communicates with the second upper surface and the second lower surface and is intended to allow coolant for cooling the cutting tip to pass therethrough.

A metal spacer according to another aspect of the present invention is arranged between a holder for holding the above-described cutting insert and the cutting insert. The metal spacer comprises: a first through hole provided so as to fix the cutting insert to the holder with the use of a screw; and a coolant passage provided so as to guide the coolant into the passage.

A holder according to a further aspect of the present invention is intended to hold the above-described cutting insert via a metal spacer. The holder comprises: fixation means for fixing the cutting insert; and a hole part for guiding the coolant.

A cutting insert according to a further aspect of the present invention is a cutting insert comprising a cutting tip and a base insert on which the cutting tip is mounted, the cutting insert being provided with a passage which is formed along a boundary surface between the cutting tip and the base insert so as to extend from a boundary part, in an upper surface of the cutting insert, between the cutting tip and the base insert to another boundary part, in a lower surface of the cutting insert, between the cutting tip and the base insert.

BRIEF DESCRIPTION OF DRAWINGS

FIGS. 2A and 2B are a cross-sectional view and an enlarged plan view of the cutting insert 10.

FIGS. 3A and 3B are views illustrating the flow of coolant C of an comparative example and the cutting insert 10, respectively.

DESCRIPTION OF EMBODIMENTS

First Embodiment

An embodiment of the present invention will hereinafter be described with reference to the drawings. It should be noted that the same elements are denoted by the same symbols and will not be further explained. Further, the embodiment set forth below is illustrative in order to describe the present invention and is not intended to limit the present invention to such embodiment. Moreover, various modifications may be made to the present invention without departing from the gist of the invention.

Figure 1B:
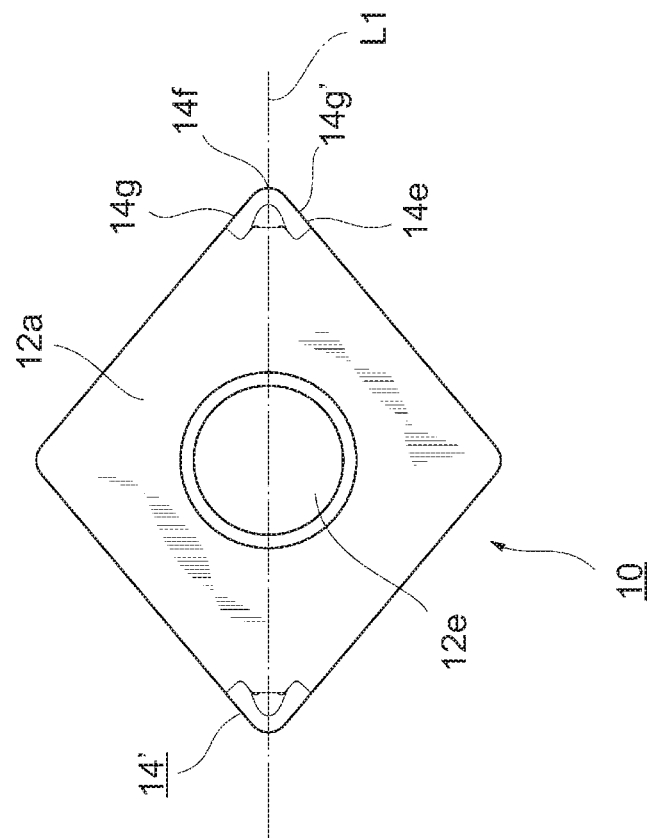
FIGS. 1A and 1B are perspective and plan views of a cutting insert 10.
Figure 1A:
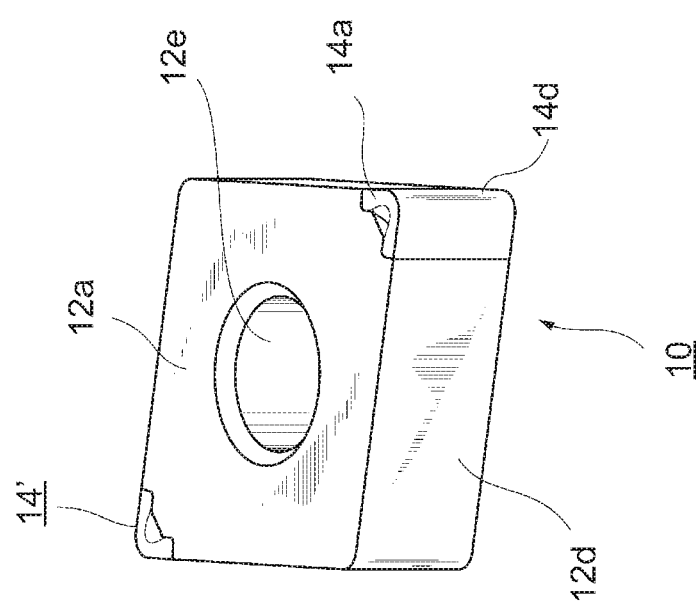

FIG. 1(a) is a perspective view of a cutting insert 10, and FIG. 1(b) is a plan view seen from a direction facing an upper surface of the cutting insert 10. The cutting insert 10 has a rhombic shape, in a plan view, with apex angles of 80° and 100°, an inscribed circle diameter of 13 mm, a thickness of 5 mm and a corner radius of 0.8 mm.

The cutting insert 10 comprises a base insert 12 and cutting tips 14 and 14' which are fixed to two opposing apexes of the base insert 12 by means of brazing or the like.

The base insert 12 consists of a cemented carbide and includes an upper surface 12a (a first upper surface), a lower surface 12b (a first lower surface) and a side surface (a first side surface) connecting the upper surface 12a and the lower surface 12b. The side surface is constituted by: a mounting surface 12c (a first mounting surface) for mounting the cutting tip 14; and a peripheral side surface 12d (a first peripheral side surface) which is connected to the upper surface 12a, the lower surface 12b and the mounting surface 12c and is exposed outward. Further, the base insert 12 is provided with a through hole 12e which penetrates the upper surface 12a and the lower surface 12b in a substantially perpendicular manner.

The cutting tips 14 and 14' are mounted at the opposing apexes of the base insert 12. The cutting tips 14 and 14' are comprised of a cubic boron nitride sintered body (hereinafter referred to as a "cBN sintered body"). For instance, a heat resistant hard coating with a thickness of 5 μm may be formed on a surface of the cBN sintered body.

The cutting tip 14 includes an upper surface 14a (a second upper surface), a lower surface 14b (a second lower surface) and a side surface (a second side surface) connecting the upper surface 14a and the lower surface 14b. The side surface is constituted by: a mounting surface 14c (a second mounting surface) opposing the mounting surface 12c of the base insert 12; and a peripheral side surface 14d (a second peripheral side surface) which is connected to the upper surface 14a, the lower surface 14b and the mounting surface 14c and is exposed outward. Further, provided at an edge 14e (an edge), which is formed by the upper surface 14a and the peripheral side surface 14d intersecting with each other, or which connects the upper surface 14a and the peripheral side surface 14d, are: two cutting edges 14g and 14g' (first cutting edges) which sandwich a corner part 14f; and a corner cutting edge which connects such cutting edges. The cutting tip 14' has the same structure as the cutting tip 14.

As shown in FIG. 1(b), the base insert 12 and the cutting tip 14 are, in a plan view seen from a direction facing the upper surfaces 12a and 14a, provided so as to be in line symmetry with respect to a line L1 (a line) passing through the corner part 14f located on the edge 14e.

The upper surface 14a and the lower surface 14b have the same configuration, and the base insert 12 and the cutting edge 14 are provided so as to be in plane symmetry with respect to a reference plane located in the middle between a plane including the upper surface 12a (and the upper surface 12b) and a plane including the lower surface 12b (and the lower surface 14b). Therefore, the cutting insert 10 can achieve machining with the use of each of the following edges: the two cutting edges 14g (a forward direction) and 14g' (a backward direction) provided at the edge between the upper surface 14a and the peripheral side surface 14d; two cutting edges provided at an edge between the lower surface 14b and the peripheral side surface 14d; and four cutting edges provided similarly in the cutting tip 14'. In addition, the lower surface 12b and the lower surface 14b are provided with the same configurations as those of the elements of the upper surface 12a and the upper surface 14a.

FIG. 2(a) is a cross-sectional view of the cutting insert 10, the view being taken along a cross-section which includes the line L1 and is perpendicular to the upper surface 12a, the upper surface 14a, the lower surface 12b and the lower surface 14b.

As shown in FIG. 2(a), at a boundary between the cutting tip 14 and the base insert 12, a passage PA is formed which is constituted by passage parts PA1 through PA3.

When performing machining with the use of the cutting edge 14g or 14g' provided in the upper surface 14a of the cutting tip 14, coolant C flows through the passage PA from the lower surface side to the upper surface side and absorbs heat generated in the cutting tip 14, thereby leading to the facilitation of heat exhaust. Meanwhile, when performing machining either of the cutting edges provided in the lower surface 14b of the cutting tip 14, the flow direction of the coolant C is opposite to the above-mentioned direction.

Herein, the passage PA is constituted by: the passage part PA3 which starts at a boundary between the lower surface 12b and the lower surface 14b and travels in a direction away from the cutting tip 14 or the peripheral side surface 14d; the passage part PA2 which is connected to the passage part PA3 and travels in a substantially perpendicular manner toward the upper surface 12a and the upper surface 14a; and the passage part PA1 which is connected to the passage part PA2 and travels in a direction toward the cutting tip 14 or the peripheral side surface 14d so as to be connected to a boundary between the upper surface 12a and the upper surface 14a.

FIG. 2(b) is a plan view illustrating a state in which the coolant C flows out of the passage part PA1.

As shown in FIG. 2(b), in a plan view seen from the direction facing the upper surfaces 12a and 14a, the upper surfaces 12a and 14a are formed so as to be in line symmetry with respect to the line L1 passing through the edge 14e. Further, a line B1, which serves as a boundary line between the upper surface 12a and the upper surface 14a, or which serves as an edge between the upper surface 12a and the mounting surface 12c, is a line which is in line symmetry with respect to the line L1 and is a wavy line segment.

As to the boundary line B1, two ends connected to the peripheral surface are defined as points P2 and P2' (end points), and a point which is located as the middle point between the point P2 and the point P2' and where the boundary line B1 and the line L1 intersect with each other is defined as a point P1 (an intersection). At this time, a distance, in the line L1 direction, between each point on the boundary line B1 and the corner part 14f (an intersection between the line L1 and the edge 14e), has the relationship set forth below.

First, the distance, in the line L1 direction, between each point on the boundary line B1 and the corner part 14f, is constant within a predetermined distance from the middle point P1. That is, this line segment is perpendicular to the line L1. Then, the distance, in the line L1 direction, between each point on the boundary line B1 and the corner part 14*f* becomes longer, as such point moves away from the middle point P1, and such distance is at a maximum at a point P3 (a point P3'). Further, the distance, in the line L1 direction, between each point on the boundary line B1 and the corner part 14*f* becomes shorter, as such point moves away from the point P3 (the point P3') and becomes closer to the end point P2 (the end point P2').

Similarly, a passage P', which has the same structure as the passage PA, is formed at a boundary between the cutting tip 14' and the base insert 12. When performing machining with the cutting tip 14', the coolant C flows through the passage P' and absorbs heat generated in the cutting tip 14', thereby leading to the facilitation of heat exhaust.

FIG. 3(*a*) shows a cooling method with the coolant C which is employed when a work is machined by a cutting insert I serving as a comparative example. FIG. 3(*b*) shows a cooling method with the coolant C which is employed when a work is machined by the cutting insert 10 according to the present embodiment.

In a comparative example, the coolant C is ejected from only the outside of the cutting insert I. Therefore, in the first place, the amount of the coolant C which heads toward the area around the cutting edge is small, and most of such amount of the coolant C bounces off chips W from the work, and thus, the area around the cutting edge cannot be cooled efficiently. Further, constraints are placed on the mounting position and the orientation of a nozzle for ejecting the coolant C, thereby leading to a problem in that it is difficult to adjust the nozzle in order to achieve the appropriate position and angle.

Meanwhile, in the present embodiment, when the coolant C passes through the cutting insert 10, the cutting tip 14 can be cooled directly. Further, due to a small amount of the chips W which obstruct the coolant C, the coolant C can be ejected efficiently toward the area close to a machining surface of the cutting tip 14, thereby leading to the facilitation of cooling. Moreover, the coolant C collides with the back side of each of the chips W, and thus, the chips W can be forcedly separated from a rake surface, thereby leading to the suppression of crater wear. Furthermore, it is expected that, when the coolant C collides with the chips W, the chips W will be deformed, thereby leading to an improvement in chip control.

In particular, because the passage part PA1 on the outlet side of the coolant C travels in the direction toward the cutting tip 14 so as to be connected to a boundary part between the upper surface 14*a* and the upper surface 12*a*, the coolant C can be ejected closer to the surface to be machined.

The passage part PA3 on the inlet side of the coolant C starts from a boundary part between the lower surface 14*b* and the lower surface 12*b* and travels in the direction away from the cutting tip 14, and thus, when any cutting edge on the lower surface 12*b* side is used for machining, the coolant C can be ejected toward a position near the cutting location. Therefore, the cooling of the cutting tip 14 is facilitated, whereby the extension of the life of the cutting insert 10 can be achieved. However, at the same time as when, as shown in FIG. 3(*b*), the coolant C is ejected from the inside of the cutting insert 10, the coolant C may be ejected additionally from the outside of the cutting insert 10, as shown in FIG. 3(*a*).

Figure 4A:
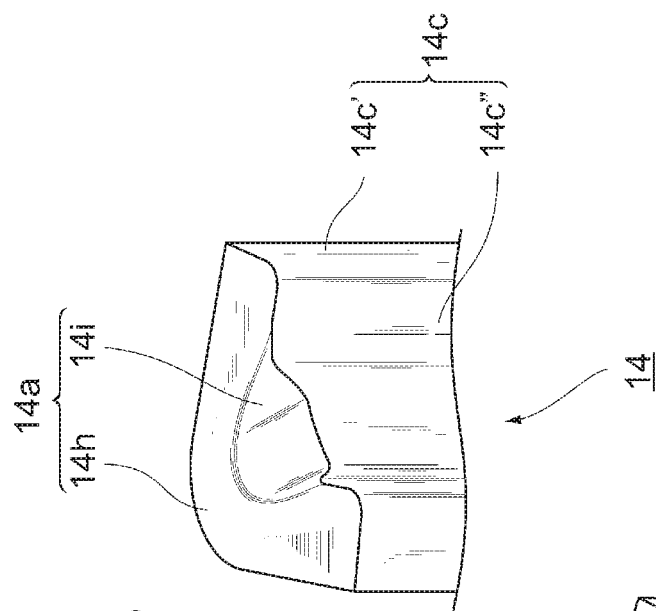
FIGS. 4A to 4C are a perspective views of a base insert 12, a cutting tip 14, and the base insert 12 to which the cutting tip is attached, respectively.
Figure 4B:
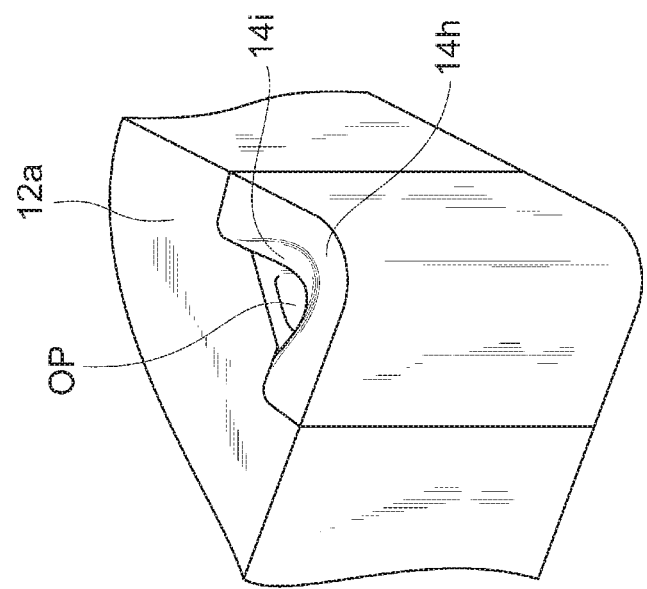
Figure 4C:
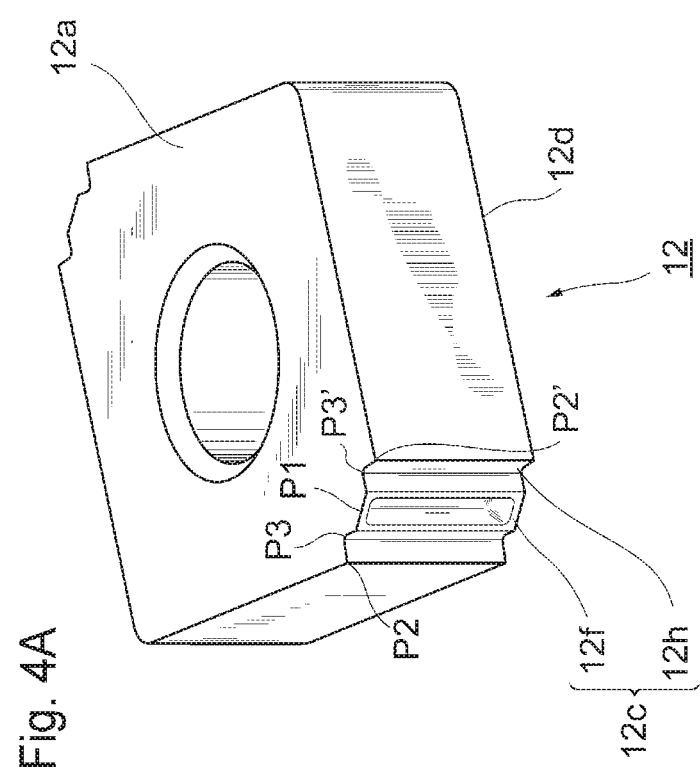

FIG. 4(*a*) is a perspective view of a base insert 12 before the cutting tip 14 is mounted thereon and integrated therewith. FIG. 4(*b*) is a perspective view of the same cutting tip 14. FIG. 4(*c*) is a perspective view when the two elements are fixed to each other.

As shown in FIG. 4(*a*), the mounting surface 12*c* on which the cutting tip 14 is mounted comprises: a securing surface 12*h* (a first securing surface) fixed to the cutting tip 14 via brazing or the like; and a passage surface 12*f* (a first passage surface) separate from and opposing the mounting surface 14*c* of the cutting tip 14.

Further, as shown in FIG. 4(*b*), the mounting surface 14*c* of the cutting tip 14 comprises: a securing surface 14*c*' fixed to the securing surface 12*h* of the base insert 12; and a passage surface 14*c*'' (a second passage surface) separate from and opposing the passage surface 12*f* and thereby forms part of an inner surface of the passage PA.

The securing surface 12*h* of the base insert 12 is a surface which passes through the line segment B1 shown in the plan view of FIG. 2(*b*) (the line segment passing through the middle point P1, the end points P2 and P2' and the points P3 and P3') and is perpendicular to the upper surface 12*a* and the lower surface 12*b*. Further, the passage surface 12*f* comprises, at a center part of the securing surface 12*h*, a surface dented inward, i.e., in the direction away from the cutting tip 14.

Meanwhile, as shown in FIG. 4(*b*), the upper surface 14*a* of the cutting tip 14 comprises: a rake surface 14*h*; and a guiding surface 14*i* which is connected to the rake surface 14 and is dented in the direction of the lower surface 14*b* and connected to the passage PA. The rake surface 14*h* is not necessarily a flat surface, and may be flat so as to be capable of functioning as a rake surface or may be provided with a chip breaker. The securing surface 14*c*' and the passage surface 14*c*'' are included in a plane perpendicular to the reference plane.

As shown in FIG. 4(*c*), when the cutting tip 14 is mounted on the base insert 12, each of the upper surface 14*a* and the lower surface 14*b* is provided with the guiding surface 14*i* such that either an upper end of the passage surface 12*f* or a lower end thereof is exposed, whereby an opening OP which communicates with the passage PA can be formed in each of the upper surface 14*a* and the lower surface 14*b*.

Herein, the angle of the passage surface 12*f* relative to the securing surface 12*h* and the angle of the guiding surface 14*i* are adjusted, whereby the ejection angle and ejection position of the coolant C can be adjusted. For example, in an inner surface of the passage surface 12*f*, a downward surface which forms the passage part PA1 and an upward surface which forms the passage part PA3 (an upward surface and a downward surface) may each be provided so as to form an angle close to 90° with respect to the passage part PA2, whereby the ejection angle of the coolant C can be made close to parallel to the rake surface.

Serration connection is established between the cutting tip 14 and the base insert 12 at the surface where they are fixed to each other. Therefore, the adhesion (dynamic adhesion) can be enhanced by increasing the area of such securing surface. Further, securing can be maintained with respect to an external force in a lateral direction (a direction perpendicular to the line L1).

As described above, according to the present embodiment, the passage PA is provided which is formed along a boundary surface between the cutting tip 14 and the base insert 12 so as to extend from the boundary part, in the upper surface of the cutting insert 10, between the cutting tip 14 and the base insert 12 to the boundary part, in the lower surface of the cutting insert 10, between the cutting tip 14 and the base insert 12. From the above, while the entire respective opposing surfaces of a base insert and a cutting tip are originally desired to be fixed to each other in order to ensure a sufficient adhesion force (dynamic adhesion), the present embodiment is intentionally configured such that parts of the above respective surfaces form the passage for the coolant C. Therefore, heat exhaust of the cutting tip can be facilitated also at the boundary between the base insert and the cutting tip.

Further, as described above, an increased amount of the coolant C can be ejected to the area around the machining part, and thus, the cooling of the cutting tip 14 can be facilitated. Moreover, the coolant C is ejected to the back side of each chip, whereby the discharging of chips can also be facilitated.

However, the embodiment described above is intended to facilitate the understanding of the present invention, and is not intended to allow for the present invention to be interpreted in a limited manner. For instance, such embodiment can be used for a cutting insert comprising cutting tips comprised of something other than a cBN sintered body (for example, a diamond sintered body). Further, the technical idea indicated in the present embodiment is applicable to cutting tools other than turning tools. Such technical idea is also applicable to a negative or positive-type cutting tip having, in a plan view, a triangular shape, a hexagonal shape, any other polygonal shape, a round shape or the like. Moreover, the base insert 12 and the cutting tip 14 may be provided so as to be in rotational symmetry with respect to the through hole 12e or may be provided so as to be in axial symmetry with respect to a line perpendicular to the axis of the through hole 12e (that is, the upper surface 12a and the lower surface 12b can be used in a reverse state). Furthermore, the edge 14e (the edge) connecting the upper surface 14a and the peripheral side surface 14d may include a honed region.

The passage PA is not limited to being constituted by a single passage but may be constituted by multiple passages. The passage PA may be configured so as to branch out, at some middle point thereof, into multiple passages. Further, the base insert and the cutting tip may not necessarily be flush with each other. Depending on the use, a configuration may be employed in which the upper surface 14a of the cutting tip protrudes with respect to the upper surface 12a of the base insert.

The elements of the embodiment as well as the arrangements, materials, conditions, shapes, sizes, etc. thereof are not limited to those illustrated and may be changed as appropriate.

In addition, it is possible to employ a cutting insert which does not comprise part of the configuration of the present embodiment or any of the other embodiments; alternatively, it is possible to replace part of the configuration of an embodiment with part of the configuration of another embodiment or to incorporate part of the configuration of an embodiment into the configuration of another embodiment.

[Configurations of Holder and Metal Spacer]

Description will be made below regarding the configuration of a holder 16 (a tool body) for holding the cutting insert 10 according to the above embodiment and the configuration of a metal spacer 18.

Figure 5:
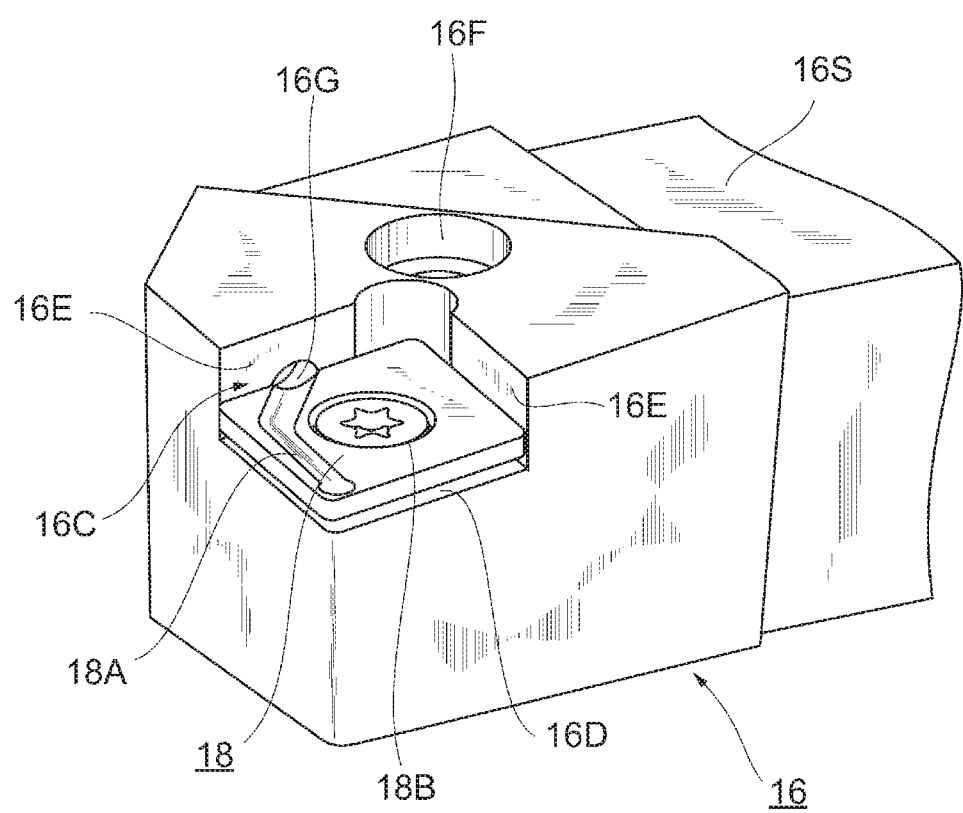
FIG. 5 is a perspective view of a holder 16.

As shown in FIG. 5, the holder 16 comprises: a rod-shaped shank part 16S which is comprised of chrome molybdenum steel and has a quadrangular shape in its cross-section; and an insert seat 16C provided in a recessed manner at a leading-end side corner part of the holder 16.

The insert seat 16C has, in a plan view, the same substantially rhombic shape as the cutting insert 10. The insert seat 16C comprises an upward seating surface 16D and two wall surfaces 16E which stand up with respect to the seating surface 16D and are substantially perpendicular to the seating surface 16D.

The seating surface 16D is provided with a screw hole (not shown) for fixing the metal spacer 18 (which may be referred to, for example, as a shim) to be placed on the seating surface, and the metal spacer 18 can be fixed to the seating surface 16D through a screw.

The holder 16 is provided with a screw hole 16F for a clamp screw 22 for fixing, with a presser bar 20, the cutting insert 10 to be placed on the metal spacer 18. The holder 16 is further provided with, in one of the wall surfaces 16E, a supply port 16G for supplying the coolant C to the cutting insert 10 via a groove part 18A (a coolant passage) formed in the metal spacer 18.

The metal spacer 18 has the same rhombic shape as the cutting insert 10 in a plan view, and the metal spacer 18 is designed such that two side surfaces thereof adhere to the two wall surfaces 16E of the insert seat 16C when the metal spacer 18 is fixed and that, in a plan view, the other two side surfaces thereof slightly protrude from end surfaces of the holder 16. Further, in order to supply the coolant C, the metal spacer 18 is provided with the groove part 18A which has one end communicating with the supply port 16G provided in the holder 16 and another end, when the cutting insert 10 is mounted, communicating with the passage part PA3 of the cutting insert 10. Moreover, the metal spacer 18 is provided with, at a center part thereof, a through hole 18B for allowing a screw to pass therethrough, such screw being screwed into a screw hole 18C formed in the seating surface 16D. An opening of the through hole 18B is provided in a tapered shape such that the head of a screw stops.

Figure 6:
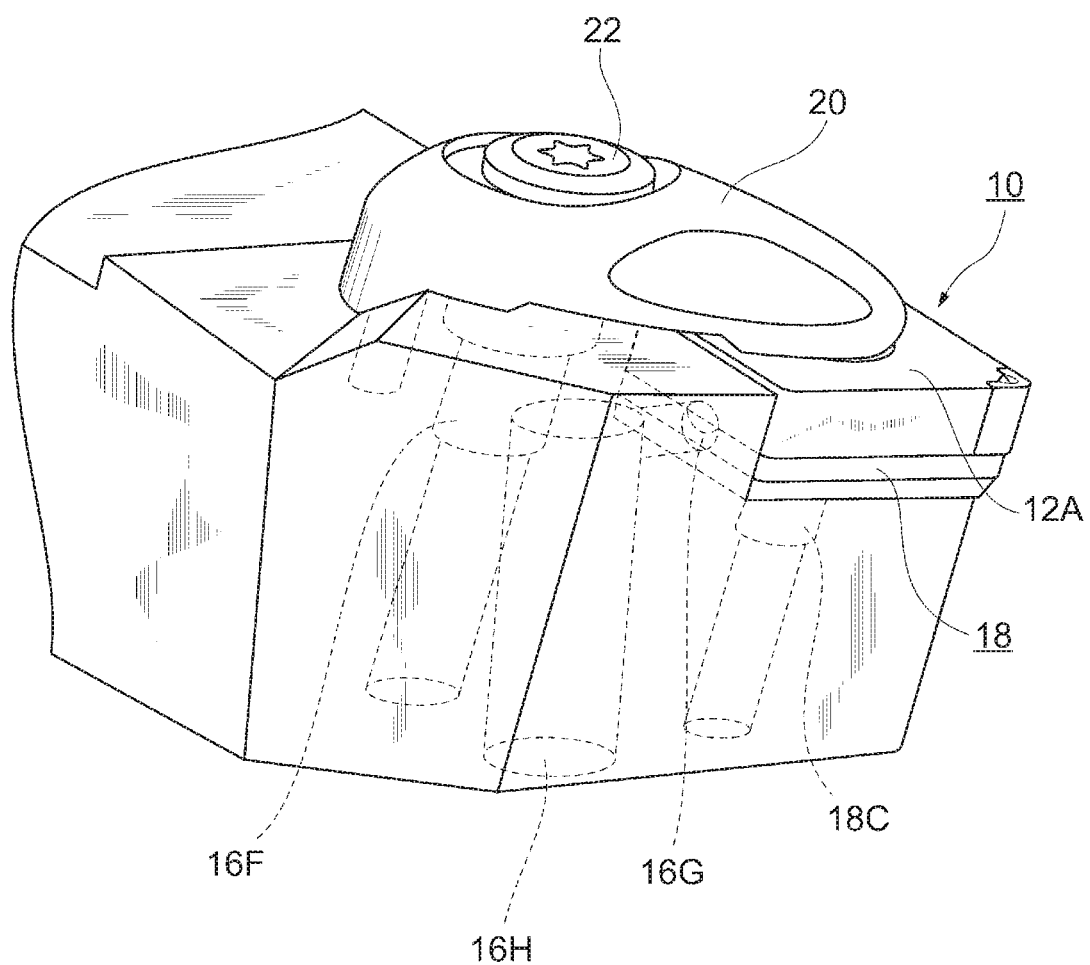
FIG. 6 is a view illustrating a state in which the cutting insert 10 is mounted on the holder 16.

FIG. 6 is a perspective view showing a state in which the presser bar 20 fixes the metal spacer 18 and the cutting insert 10 mounted on the metal spacer 18.

As shown in FIG. 6, the upper surface 12a of the base insert 12 of the cutting insert 10 is fixed to the seating surface 16D of the holder 16 via the metal spacer 18 by means of the presser bar 20 fixed, with the clamp screw 22, to the holder 16. At this time, the two wall surfaces of the metal spacer 18 and two surfaces included in the peripheral side surface 12d of the base insert 12 are fixed, through contact, to the two wall surfaces 16E.

The coolant C is supplied from a lower part of the holder 16. The lower part of the holder 16 is provided with a hole 16H which communicates with the supply port 16G. The coolant C which has passed through the holder 16 via the hole 16H is supplied from the supply port 16G through the groove part 18A of the metal spacer 18 to the passage PA of the cutting insert 10.

With the use of the holder 16 and metal spacer 18 described above, it is possible to cool the cutting tip effectively and thereby achieve the extension of tool life.

[Variations]

Description will be made below regarding variations of the cutting insert 10 according to the first embodiment. It should be noted that, with regard to the parts of the same structures or functions as those of the first embodiment, description thereof is omitted or simplified here.

Figure 7:
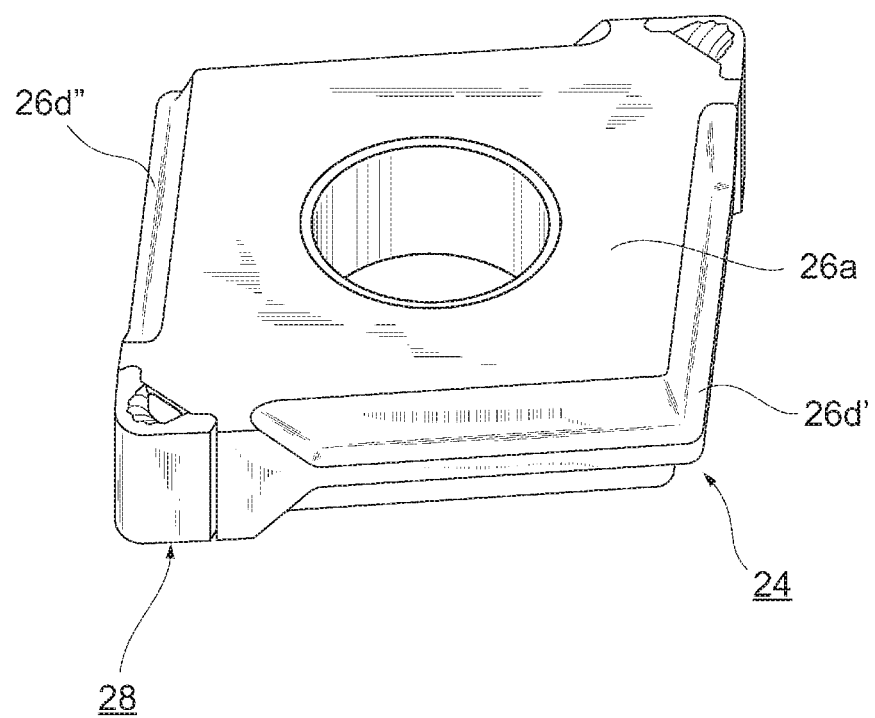
FIG. 7 is a perspective view of a cutting insert 24.

FIG. 7 is a perspective view of a cutting insert 24 according to the variation. The cutting insert 24 is different from the cutting insert 10 according to the first embodiment with respect to the point of comprising a base insert 26 and a cutting tip 28.

The base insert 26 comprises: an upper surface 26a; a lower surface 26b; a mounting surface 26c on which the cutting tip 28 is mounted; and a peripheral side surface 26*d* connected to the upper surface 26*a*, the lower surface 26*b* and the mounting surface 26*c*.

As shown in FIG. 7, the peripheral side surface 26*d* of the base insert 26 is provided with, in an intermediate part between the upper surface 26*a* and the lower surface 26*b*, an inclined surface facing toward the upper surface 26*a* and an inclined surface facing toward the lower surface 26*b* as well as a side surface part 26*d*' connected to such inclined surfaces so as to extend over two continuous sides of a rhombic shape. Similarly, the peripheral side surface 26*d* of the base insert 26 is provided with an inclined surface facing toward the upper surface 26*a* and an inclined surface facing toward the lower surface 26*b*, as well as a side surface part 26*d*" connected to such inclined surfaces so as to extend over the other two sides of the rhombic shape.

The side surface parts 26' and 26*d*" are provided as described above. Thus, in order to mold the cutting insert 10, when performing, in a die, pressing with an upper-surface side punch of a cutting insert and a lower-surface side punch thereof, leading end parts in the outer peripheries of the two punches are made flat in order to mold the side surface parts 26' and 26*d*". Therefore, compared with the case where leading ends of two punches are made sharp without providing the side surface parts 26' and 26*d*", punches, being used as components of a mold, can be made resistant to chipping. Further, the inclined surface facing toward the upper surface 26*a* presses the cutting insert 10, whereby the lifting of the cutting insert 10 during machining can be suppressed effectively. Moreover, the base insert 26 can be decreased in thickness, whereby the manufacturing cost can be reduced.

Figure 8A:
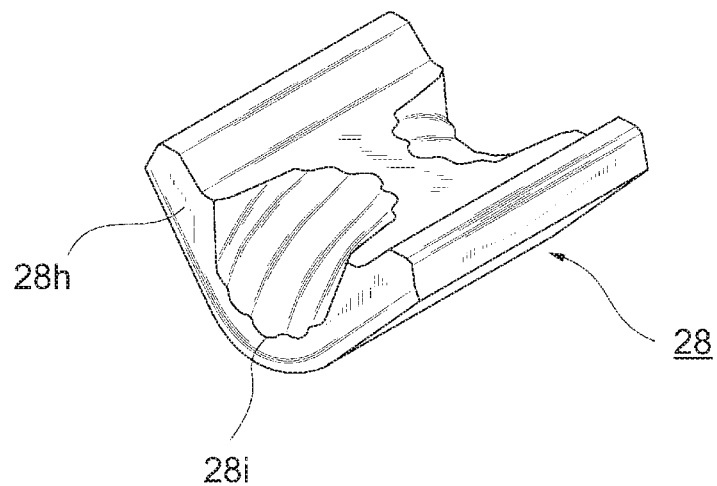
FIGS. 8A and 8B are a perspective views of a cutting tip 28 and a base insert 26, respectively.
Figure 8B:
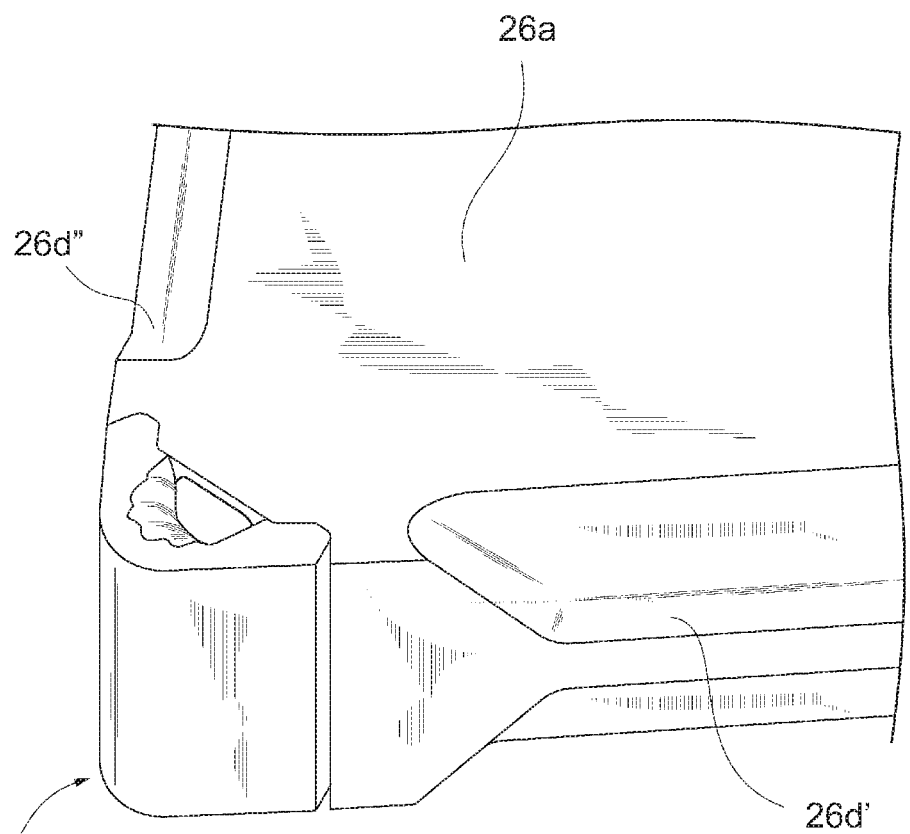

FIG. 8(*a*) is a perspective view of the cutting tip 28 according to the variation. FIG. 8(*b*) shows a state in which the cutting tip 28 is mounted on the base insert 26.

As shown in FIG. 8(*a*), the cutting tip 28 differs from the cutting tip 14 in terms of the shape of a guiding surface 28*i* leading to a flat part 28*h*. More specifically, a surface of the guiding surface 28*i* is provided with irregularities in a direction perpendicular to the flow direction of the coolant C. Such irregularities can be formed through, by way of example, laser machining.

The formation of such irregularities on the surface can increase the contact area between the coolant C and the cutting tip 28, whereby the cooling of the cutting tip 28 can be facilitated more effectively.

Figure 9:
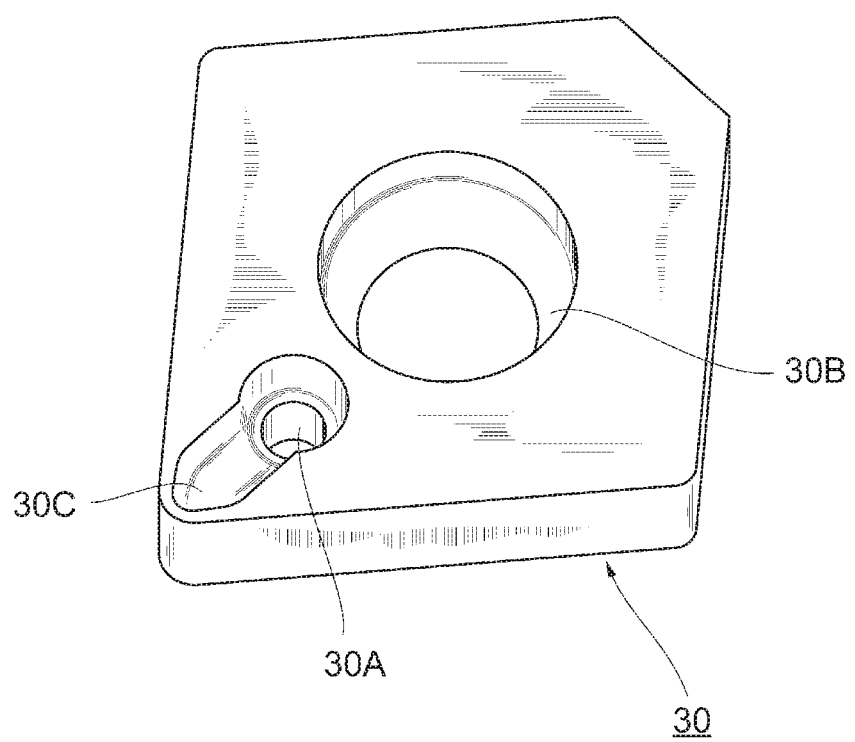
FIG. 9 is a perspective view of a metal spacer 30.

FIG. 9 shows a metal spacer 30 according to the variation. The metal spacer 30 differs from the metal spacer 18 with respect to the point of comprising a through hole 30A for supplying the coolant C rather than the groove part 18A. More specifically, the metal spacer 30 is provided with: a through hole 30B (a first through hole) for allowing a screw to pass therethrough, such screw being provided at a center part of the metal spacer 30 and intended to fix the metal spacer 30 to a holder; and the through hole 30A for supplying the coolant C to the passage PA of the cutting insert 10 (or the cutting insert 24). The through hole 30A is formed such that, when the cutting insert 10 is placed, the through hole 30A is shifted from the position of the passage part PA3 of the cutting insert 10. Therefore, the coolant C supplied from a lower surface of the metal spacer 30 is decelerated through collision with the lower surface 12*b* of the base insert 12 and is then supplied to the cutting insert 10 via a liquid reservoir 30C. The above configuration allows air bubbles, etc. to be less likely to stay in the passage of the cutting insert 10, whereby cooling is less likely to be inhibited. Further, even a cutting insert in which the openings of a passage are formed at locations different from those of the cutting insert 10 can communicate with the through hole 30A via the liquid reservoir 30C, and thus, the metal spacer 30 is applicable to various cutting inserts which are each provided with a coolant passage at a location different from that involved in the cutting insert 10.

As described above, the cutting insert according to the above embodiment and the relevant metal spacer and holder allow a cutting tip to be cooled effectively, thereby leading to the extension of tool life.

It should be noted that no limitations are placed on the method for fixing the cutting insert 10 through a holder, and various types of means may be employed for such fixation. An example of such fixation method is one involving the use of a presser piece, and further, the fixation of the cutting insert 10 can be performed through screwing, a lever, a wedge, an eccentric pin or the like.

REFERENCE SIGNS LIST

10: Cutting insert, 12: Base insert, 12*a*: First upper surface, 12*b*: First lower surface, 12*c*: First mounting surface, 12*d*: First peripheral side surface, 12*e*: Through hole, 12*f*: First passage surface, 12*h*: First securing surface, 14: Cutting tip, 14*a*: Second upper surface, 14*b*: Second lower surface, 14*c*: Second mounting surface, 14*c*': Second securing surface, 14*c*": Second passage surface, 14*d*: Second peripheral side surface, 14*e*: Edge, 14*f*: Corner part, 14*g*: Cutting edge, 14*g*': Cutting edge, 14*h*: Rake surface, 14*i*: Guiding surface, 16: Holder, 16C: Insert seat, 16D: Seating surface, 16E: Wall surface, 16F: Screw hole, 16H: Hole, 16G: Supply port, 16S: Shank part, 18: Metal spacer, 18A: Groove part, 18B: Through hole, 18C: Screw hole, 20: Presser bar, 22: Clamp screw, H: Holder, PA: Passage, PA1: Passage part, PA2: Passage part, PA3: Passage part, P1: Intersection, P2: End point, P2': End point, S: Metal spacer

What is claimed is:

1. A cutting insert comprising:
   a base insert comprising a first upper surface, a first lower surface and a first side surface connecting the first upper surface and the first lower surface; and
   a cutting tip comprising a second upper surface, a second lower surface and a second side surface connecting the second upper surface and the second lower surface, wherein:
   the first side surface comprises:
      a first mounting surface; and
      a first peripheral side surface connected to the first upper surface, the first lower surface and the first mounting surface;
   the second side surface comprises:
      a second mounting surface opposing the first mounting surface, the second mounting surface including a second passage surface; and
      a second peripheral side surface which is connected to the second upper surface, the second lower surface and the second mounting surface and in which at least an edge connected to the second upper surface is provided with a first cutting edge;
   the first mounting surface comprises:
      a first securing surface fixed to the second mounting surface; and
      a first passage surface opposing the second mounting surface; and
   the first passage surface and the second passage surface form a passage in communication with the second upper surface and the second lower surface to thereby allow coolant for cooling the cutting tip to pass therethrough.

2. The cutting insert according to claim 1, wherein the second surface is, in a plan view seen from a direction facing the second upper surface, in line symmetry with respect to a line passing through the edge.

3. The cutting insert according to claim 2, wherein, a boundary line, being a boundary between the first upper surface and the first mounting surface, includes, in a plan view seen from a direction facing the first upper surface, a point which has a maximum distance, in a direction of the line, with respect to an intersection between the line and the second peripheral side surface, such point being respectively located between an intersection between the boundary line and the line, and each of two end points of the boundary line.

4. The cutting insert according to claim 1, wherein a second edge connecting the second peripheral side surface and the second lower surface is provided with a second cutting edge.

5. The cutting insert according to claim 4, wherein the second lower surface is, in a plan view seen from a direction facing the second lower surface, in line symmetry with respect to a second line passing through the second edge.

6. The cutting insert according to claim 5, wherein, a second boundary line, being a boundary between the first lower surface and the first mounting surface, includes, as seen from a direction facing the first lower surface, a point which has a maximum distance, in a direction of the second line, with respect to an intersection between the second line and the second peripheral side surface, such point being respectively located between a second intersection, being an intersection between the second boundary line and the second line, and each of two end points of the second boundary line.

7. The cutting insert according to claim 1, wherein the first securing surface is included in a plane perpendicular to the first upper surface or the first lower surface.

8. The cutting insert according to claim 7, wherein the first passage surface comprises a surface recessed with respect to the first securing surface in a direction away from the cutting tip.

9. The cutting insert according to claim 1, wherein the passage comprises, in a plan view seen from a direction facing the first upper surface:
a first passage part which starts from a boundary between the first upper surface and the second upper surface and travels in a direction away from the cutting tip;
a second passage part which is connected to the first passage part and travels in a direction of the first lower surface; and
a third passage part which is connected to the second passage part and travels in a direction toward the cutting tip so as to be connected to a boundary between the first lower surface and the second lower surface.

10. The cutting insert according to claim 1, wherein the second upper surface comprises:
a first flat part; and
a first guiding surface which is recessed with respect to the first flat part in a direction of the second lower surface so as to be connected to the passage.

11. The cutting insert according to claim 10, wherein a surface of the first guiding surface is provided with irregularities in a direction perpendicular to a flow direction of the coolant.

12. The cutting insert according to claim 1, wherein the first peripheral side surface comprises at least one side surface part facing toward the first upper surface, in an intermediate part between the first upper surface and the first lower surface.

13. A metal spacer for being arranged between a holder for holding the cutting insert according to claim 1 and the cutting insert, the metal spacer comprising:
a first through hole provided so as to fix the cutting insert to the holder with the use of a screw; and
a coolant passage provided so as to guide the coolant into the passage.

14. A holder for holding the cutting insert according to claim 1, the holder comprising:
fixation means for fixing the cutting insert; and
a supply port for guiding the coolant.

* * * * *